United States Patent [19]
Tamura et al.

[11] Patent Number: 5,515,953
[45] Date of Patent: May 14, 1996

[54] FRICTIONAL FORCE TRANSMITTING DEVICE USED IN VACUUM

[75] Inventors: Hideki Tamura; Satoru Hiro, both of Ise, Japan

[73] Assignee: Shinko Denki Kabushiki Kaisha, Tokyo, Japan

[21] Appl. No.: 902,862

[22] Filed: Jun. 23, 1992

[30] Foreign Application Priority Data

Jun. 25, 1991 [JP] Japan .................................. 3-179023
Sep. 25, 1991 [JP] Japan .................................. 3-271815
Jan. 31, 1992 [JP] Japan .................................. 4-040642

[51] Int. Cl.$^6$ ........................................... F16D 69/00
[52] U.S. Cl. ........................... 188/251 A; 188/251 M; 188/250 G
[58] Field of Search ................. 188/251 R, 251 A, 188/251 M, 73.1, 250 B, 250 G; 192/107 M

[56] References Cited

U.S. PATENT DOCUMENTS

| | | | |
|---|---|---|---|
| 3,191,734 | 6/1965 | Batchelor et al. | 188/251 M X |
| 3,856,120 | 12/1974 | Kwolek et al. | 188/251 A |
| 4,156,479 | 5/1979 | Kawamura | 188/218 A |
| 4,173,681 | 11/1979 | Durrieu et al. | 188/251 A X |
| 4,202,432 | 6/1980 | Komori et al. | 188/251 A X |
| 4,256,801 | 3/1981 | Chuluda | 188/251 A X |
| 4,351,885 | 9/1982 | Depoisier et al. | 188/251 M X |
| 4,613,021 | 9/1986 | Lacombe et al. | 188/251 A X |
| 4,762,216 | 8/1988 | Pusatcioglu et al. | 188/251 A X |
| 5,078,248 | 1/1992 | Yesnik | 188/251 M X |

FOREIGN PATENT DOCUMENTS 38744 10/1981 European Pat. Off. .......... 188/251 M

OTHER PUBLICATIONS

Wear Mater, vol. 1, 1987, pp. 381–387, H. M. Hawthorne, "Wear Debris Induced Friction Anomalies of Organic Brake Materials in Vacuo".

Tribologist, pp. 53–60, 1989, T. Iwata, et al., "Brake Materials for Space Actuator".

Wear of Materials, ASME 1991, pp. 277–288, H. M. Hawthorne, "On the Role of Interfacial Debris Morphology in a Conforming Contact Tribosystem".

*Primary Examiner*—Robert J. Oberleitner
*Assistant Examiner*—Kevin D. Rutherford
*Attorney, Agent, or Firm*—Oblon, Spivak, McClelland, Maier & Neustadt

[57] ABSTRACT

In a conventional frictional force transmitting device used in a vacuum, a problem has arisen when the device performs a sliding action over a certain distance, that is, its frictional force suddenly drops, which makes it impossible for the device to fulfill a desired function of braking. The above-mentioned problem in the frictional force transmitting device used in a vacuum for performing the function of braking, transmitting a frictional force, and effecting acceleration or deceleration, can be solved by improving the device, that is, by means of making its two opposing frictional elements so as to be selectively pressed against each other, in which one of the frictional elements is made of metal or of non-metallic materials and the other made of organic frictional materials, wherein the one of the frictional element made of metal or nonmetallic materials has surface roughness coarser than 3 microns in maximum height(Rmax) and is coarser than the other made of organic frictional materials.

6 Claims, 5 Drawing Sheets

FRICTIONAL FORCE TRANSMITTING DEVICE USED IN VACUUM

BACKGROUND OF THE INVENTION

1. Field of the Invention

The present invention relates to an improvement in frictional force transmitting devices used in a vacuum, which devices have frictional elements selectively pressed against each other so as to brake, accelerate or decelerate one of the frictional elements, or to transmit a frictional force from one of the frictional elements to the other.

2. Description of the Prior Art

For example, a conventional electromagnetic frictional brake, which is one of the typical frictional force transmitting device, generally has the following construction:

First, in this type of electromagnetic frictional brake, there are provided a braking side and a braked side.

Further, a braking-side disk and a braked-side disk are mounted on the braking side and the braked side, respectively. The braking-side disk is made of metal, while the braked-side disk is made of organic frictional materials.

In operation, the braking-side disk is urged against the braked-side disk to stop the same from rotating.

Incidentally, a disk made of organic frictional materials may be used as the braking-side disk.

On the other hand, in the above construction, the surface roughness of the metallic disk in the conventional electromagnetic frictional brake used in a vacuum is: 0.05 micron in Ra; and less than 2 microns in Rmax.

Surface roughness referred to above is publicly known as described in the following documents (1) and (2): document (1) shows it as Ra; and document (2) shows it as as Rmax:

Furthermore, it is known from the document (3) that studies on brake materials for vacuum/space brakes have been made up to the present.

(1) Hawthone, H. M: Wear Debris Induced Friction Anomalies of Organic Brake Materials in Vacuo, Wear materials, Vol.1 (1987), pp. 381–387;

(2) Iwata, Machida and Toda: Brake Materials for Space Actuators, Tribologist, Vol. 34, No. 10 (1989), pp. 757–764;

(3) Hawthone, H. M.: On the Role of Interfacial Debris Morphology in a Conforming Contact Tribosystem, 8th Int.Conf. on wear of Materials, ASME (1991), pp. 277–288.

The conventional device having the above-mentioned construction suffers from the following problem.

Namely, when an electromagnetic frictional brake is used in a vacuum, the brake's frictional force suddenly drops after it has performed sliding action over a certain length of distance, which often makes it impossible for the brake to further perform a predetermined braking function.

This phenomenon will be explained with reference to FIG. 8 which is a diagram illustrating the relation between the sliding distances and the coefficient of friction, and the horizontal axis of the diagram shows the sliding distance and the vertical axis shows the coefficient of friction.

The braking-side disks used in the experiments are made of metal (mild steel), and one of them has a surface roughness of 1 micron in maximum height (Rmax) and the other is free from such restriction placed upon the surface roughness, on the other hand, the braked-side disk is made of organic frictional materials.

In the diagram, the line "a" shows data obtained in the atmosphere, and the line "b" shows data obtained in a vacuum. As can be seen from FIG. 8, it is clear in a vacuum, the coefficient of friction drops suddenly when the cumulative sliding distance exceeds a certain value.

Although, the above-mentioned document (1) shows, as the same phenomenon, an example using a braking-side disk made of stainless steel and having a surface roughness of 0.05 micron in Ra, a problem arised when the example having such construction is applied to devices used in a vacuum.

SUMMARY OF THE INVENTION

It is an object of the present invention to solve the above problem inherent in the conventional device by providing a small-sized and light-weight frictional force transmitting device which is free from the problem of the drop in the frictional force in use even when the device has performed a sliding action over a long distance.

In more detail, frictional force transmitting device to satisfy the above object of the present invention is accomplished, by providing an improvement in a frictional force transmitting device used in a vacuum for performing the function of braking or transmitting a frictional force, accelerating or decelerating, by means of allowing its frictional elements to be selectively pressed against each other, and one of the frictional element being made of organic frictional materials and the other being made of metal or of non-metallic materials which are higher in hardness than or equal to mild steels, wherein the one of the frictional elements made of metal or non-metallic materials, is coarser in surface roughness than that of the other frictional elements made of the organic frictional materials.

In this case, one of the frictional elements, which is made of metal or non-metallic materials, may have a surface roughness coarser than 3 microns in maximum height (Rmax).

In addition, one of the frictional elements, made of metal or of non-metallic materials, may have a surface roughness coarser than 0.3 micron in center line average height (Ra).

It becomes possible for the device to prevent its frictional force from dropping in a vacuum, by making one of the frictional elements made of metal or of non-metallic materials; either to have a surface roughness coarser than the other of the frictional elements made of organic frictional material;

or to have a surface roughness coarser than 3 microns in maximum height (Rmax);

or to have a surface roughness of coarser than 0.3 micron in center line average height (Ra).

DESCRIPTION OF THE PREFERRED EMBODIMENTS

Hereinbelow, a first to a third embodiments of the present invention will be described in detail with reference to FIGS. 1 to 4.

In each of these embodiments, the present invention is applied to an electromagnetic frictional brake.

First, with reference to FIG. 1, the construction of the electromagnetic frictional brake to which the present invention is applied will be described.

Figure 1:
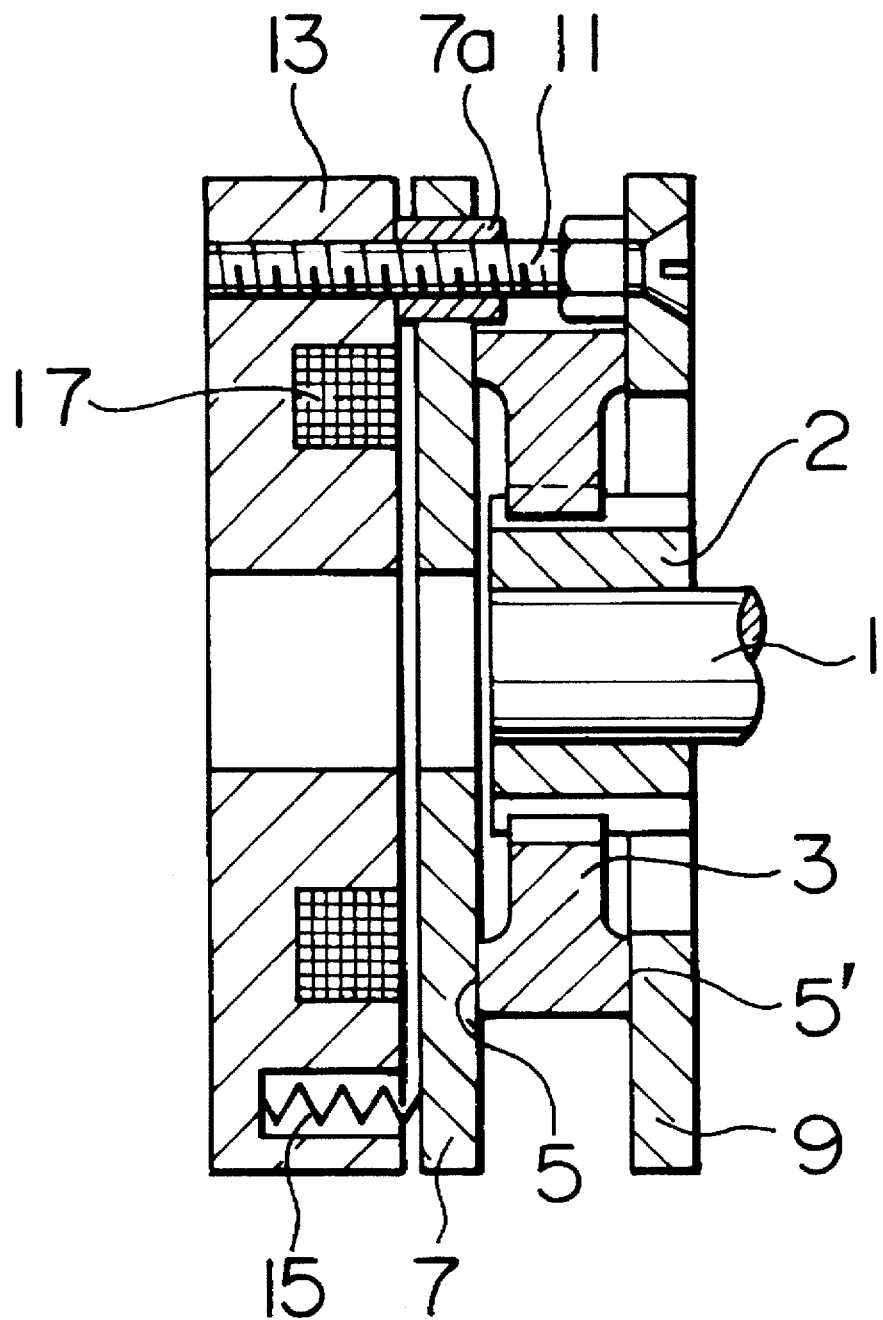
FIG. 1 is a longitudinal sectional view of the electromagnetic brake to which a first to a third embodiments of the present invention are applied.

As shown in FIG. 1, a rotating shaft 1 is provided in a braked side of the brake. The rotating shaft 1 is spline coupled to a braked-side disk 3 through a hub 2 so that the shaft 1 and the disk 3 must turn integrally together. The braked-side disk 3 is made of organic frictional materials, for example, polyimides, phenolic type resins and the like. As is clear from the drawing, right and left faces of the disk 3 form braked surfaces 5, 5'.

On the other hand, in the brake, there are provided a pair of braking-side disks 7, 9 as a braking side of a brake, and these disks 7 and 9 are so arranged as to pinch the braked-side disk 3 therebetween in a sandwich manner.

Of these braking-side disks 7, 9, the disk 9 is fixedly mounted on a base plate 13 through a threaded member such as an adjusting bolt and the like.

On the other hand, the other braking-side disk 7 is slidably mounted on a collar 7a so that the disk 7 may slidably move right and left along the collar 7a, as viewed in the drawing. A coil spring 15 urges the disk 7 to the braked-side disk 3.

When a solenoid 17 is energized, the braking-side disk 7 moves leftward against a resilient force exerted by the coil spring 15, as viewed in the drawing.

In case the solenoid 17 is not energized, the pair of the braking-side disks 7 and 9 are urged against the braked surfaces 5, 5 of the braked-side disk 3, so that the brake can performs the desired function of braking to prevent the rotating shaft 1 from rotating.

In contrast with this, when the solenoid is energized, the braking-side disk 7 is moved away from the braked surface 5 of the braked-side disk 3 to stop the braking action, thereby permitting the rotating shaft 1 to rotate.

Each of the braking-side disks 7, 9 is made of metal (for example such as mild steel, austenitic stainless steel, aluminum alloys, titanium, various surface-treated steels and the like), and thus has following surface roughness:

First, in the case of the first embodiment, each of the metallic disks 7, 9 is so constructed as to be coarser in surface roughness than that of the disk 3 made of organic frictional materials.

Now, the relation, between a ratio Rs of the surface roughness of the metallic disk to the surface roughness of the disk made of organic frictional materials and the frictional force, will be described with reference to FIG. 2.

Figure 2:
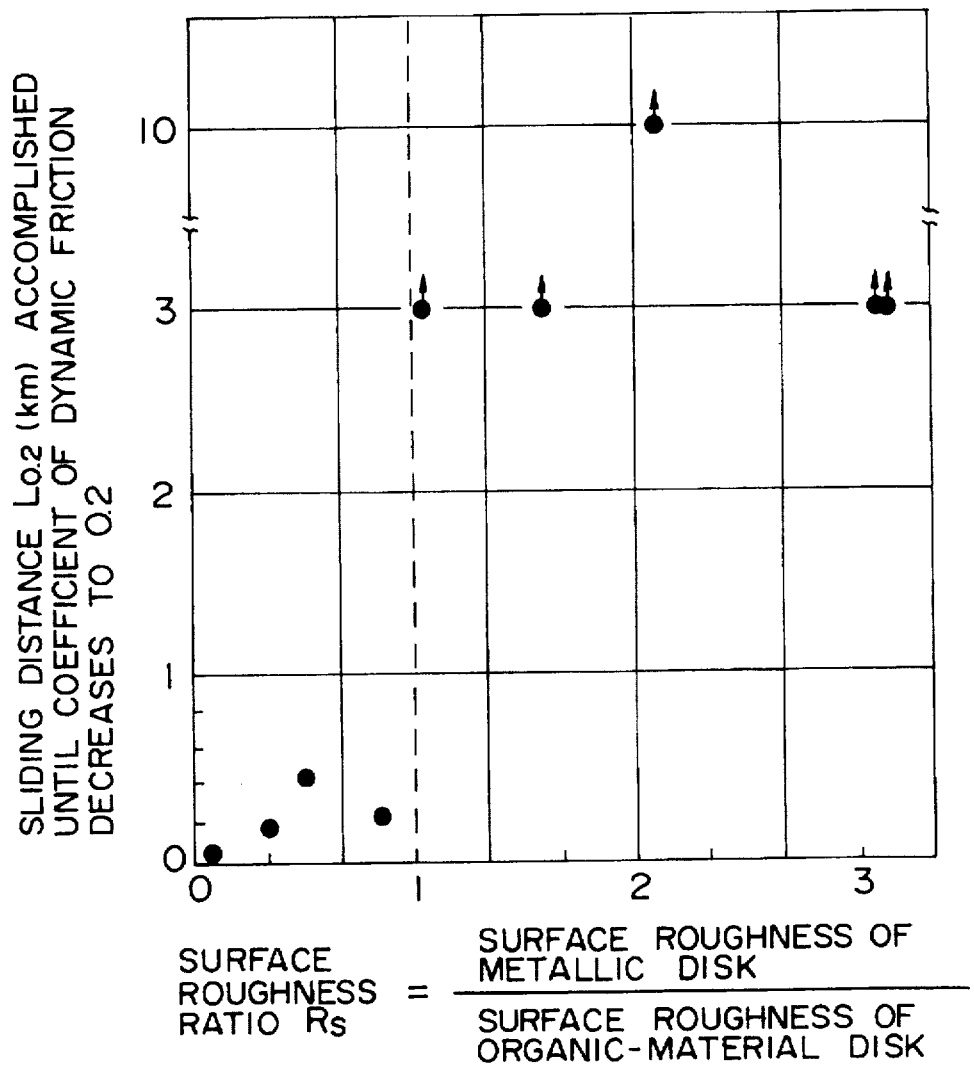
FIG. 2 is a diagram illustrating the function of the first embodiment of the present invention, in which is shown the relation between a surface roughness ratio Rs and a frictional force, to show the relation between the surface roughness ratio Rs and the sliding distance accomplished until the coefficient of dynamic friction decreases to 0.2.

FIG. 2 is a diagram illustrating a variation in the above relation, in which diagram: the horizontal axis shows the ratio Rs of the surface roughness of the metallic disk to the surface roughness of the disk made of organic frictional materials; and the vertical axis shows a sliding distance ($L_{0.2}$) accomplished until the coefficient of dynafriction decreases to 0.2.

Further, in this case, the metallic disks are made of the same materials as those of the braking-side disks 7 and 9, and are subjected to a unidirectional sanding.

In operation, such metallic disks are brought into frictional contact with the disk which is made of the same organic frictional materials as those of the braked-side disk 3. As is clear from FIG. 2, when each of the metallic disks is coarser in surface roughness than the disk made of organic frictional materials, the coefficient of dynamic friction decreases to 0.2 until the cumulative sliding distance reaches a value of about 0.5 km at maximum.

Further, in this case, after completion of the experiments, the friction surfaces had become blackened.

In contrast to this, when the ratio Rs of the surface roughness is equal to or coarser than 1, the sliding distance reaches a value of at least 3 km, and among the results shown by the sliding distance, it is confirmed that a value of 10 kilometer or more is reached in the experiments. In other words, by making the surface roughness ratio greater than 1, it is possible to prevent the frictional force from dropping. In addition, in this case, spots of organic frictional materials, having a colour which seems very similar to those of cut chips of the organic frictional material, has adhered to the surfaces of the metallic disks, and they were quite different from those of the blackenned frictional surfaces mentioned above. Incidentally, the organic frictional materials adhered to the surfaces of the metallic disc were proved to be those removed from the disk made of the organic frictional materials scraped off by the irregular projections of the coarsened metallic surfaces.

In addition to the above-mentioned unidirectional sanding, as a method for coarsening the surfaces of the metallic disks, there are some other means such as shot blasting and circumferential sanding which can ensure the same effect as that obtained by the unidirectional sanding.

As described above, according to the first embodiment of the present invention, it is possible to prevent the frictional force from dropping in a vacuum, thereby permitting the brake to perform the function of braking for a long period of time in a steady manner. This is the effect introduced by the construction in which each of the metallic braking-side disks 7 and 9 is coarser in surface roughness than that of the braked-side disk made of organic frictional materials.

Next, in the second embodiment of the present invention, each of the metallic disks has a surface roughness coarser than 3 microns in maximum height (Rmax). This will be described with reference to FIG. 3 which shows in section an enlarged part of the surfaces of the braking-side disks 7 and 9.

The above-mentioned maximum height (Rmax) is defined in JIS B 0601-1982 "Surface Roughness", and it indicates the maximum vertical distance between a convexed portion 19 and a concaved portion 21 of the surface irregularities in a standard length (L). By employing the construction in which the maximum height (Rmax) is not less than 3 microns, the frictional force is prevented from dropping in a vacuum.

Figure 4:
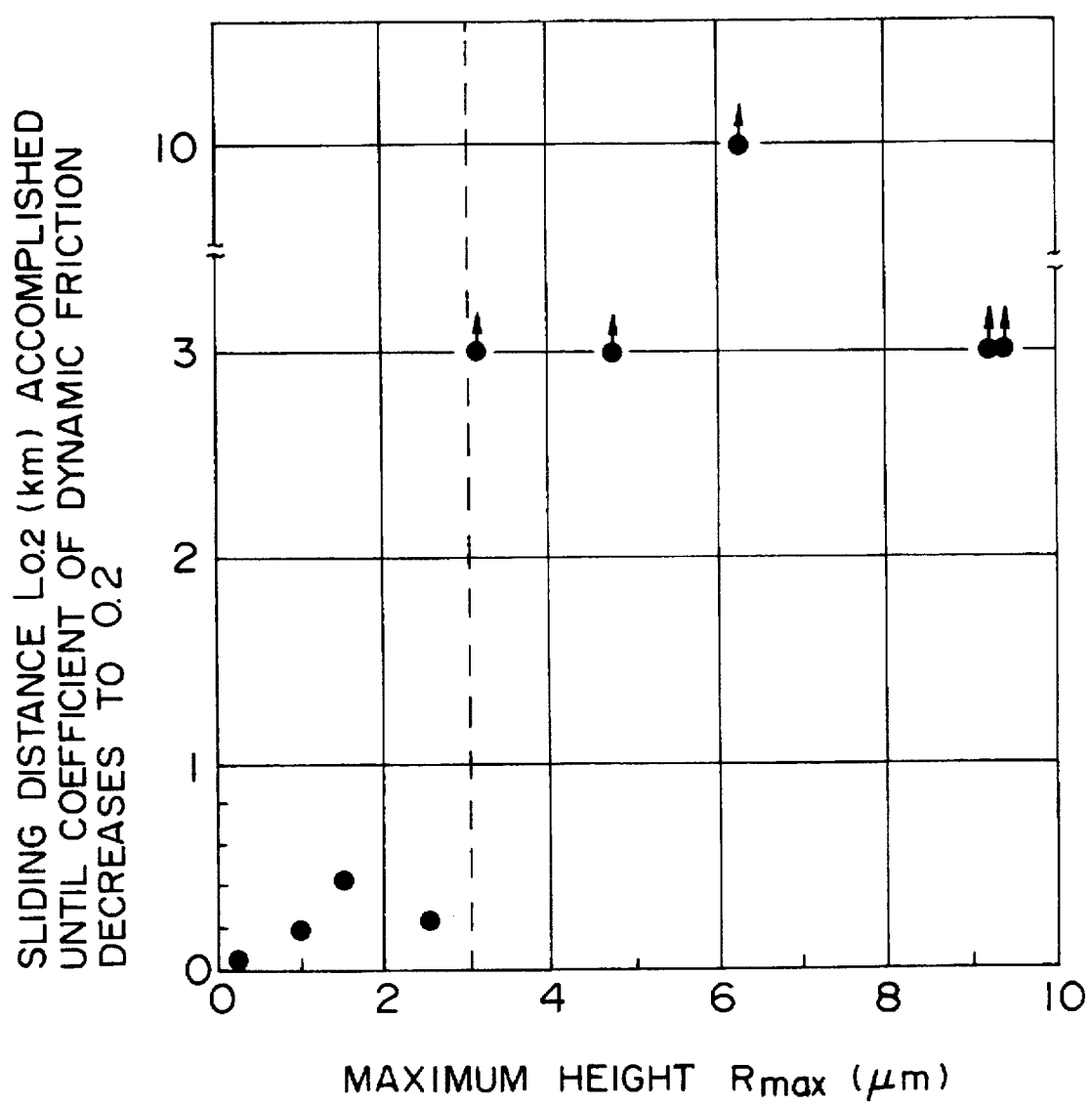
FIG. 4 is a diagram illustrating the function of the second embodiment of the present invention, in which is shown the relation between the maximum height (Rmax) and the frictional force to show the relation between the surface roughness (maximum height) of the metallic disk and liding distance accomplished until the coefficient of dynamic friction decreases to 0.2.

Now, with reference to FIG. 4, the relation between the maximum height (Rmax) and the frictional force will be described. FIG. 4 is a diagram illustrating the function of the second embodiment of the present invention, in which: the horizontal axis shows the maximum height (Rmax); and the vertical axis shows a sliding distance ($L_{0.2}$) until the coefficient of dynamic friction decreases to 0.2.

In this case, the metallic disks are made of the same material as those of the braking-side disks 7 and 9, and are subjected to unidirectional sanding.

Pressed against such metallic disks is the disk made of the same organic frictional materials as those of the braked-side disk 3.

As is clear from FIG. 4, in case the maximum height (Rmax) is less than 3 microns (for example, if it is 0.2 or 2.6 microns), the coefficient of dynamic friction decreases to 0.2 before the cumulative sliding distance reaches a value of about 0.5 km at maximum. In this case, after the completion of the experiments, the friction surfaces are blackened.

In contrast to this, when the maximum height (Rmax) is equal to or larger than 3 microns, the sliding distance reaches a value of at least 3 km. Among the test records on the sliding distance, it is confirmed that some samples showed a value of 10 or more kilometer.

Namely, by allowing the maximum height (Rmax) be equal to or larger than 3 microns, it is possible to prevent the frictional force from dropping in a vacuum, in addition, in this case the organic frictional materials adhered to the surfaces of the metallic disks and spotted the same with a color which seemed to be quite similar to those of cut chips of the organic frictional material but the color was quite different from that of the blackened friction surfaces mentioned above.

Incidentally, in addition to the above-mentioned unidirectional sanding there are shot blasting and a circumferential sanding, as a method for roughening which can ensure the same effect as that obtained by unidirectional sanding.

According to the second embodiment of the present invention as described above, it is possible to prevent the frictional force from dropping in a vacuum, thereby permitting the brake to perform the function of braking for a long period of time in a steady manner. This is the effect brought about by the construction in which each of the braking-side disks 7 and 9 has a surface roughness of 3 or more microns in maximum height (Rmax).

Figure 3:
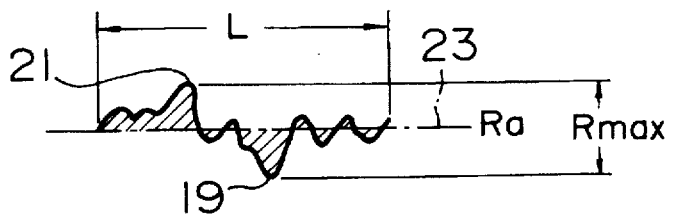
FIG. 3 is a diagram illustrating the second and the third embodiments of the present invention, in which are shown the maximum height (Rmax) and the center line average height (Ra)

Next, the third embodiment of the present invention will be described. In this third embodiment, each of the braking-side disks 7 and 9 is so constructed as to have a surface roughness in center line average height (Ra) to be coarser than 0.3 micron, which surface roughness in center line average height(Ra) is defined in the above-mentioned JIS as follows:

Namely, in FIG. 3, areas of two shaded portions, that is a convexed portion 21 and a concaved portion 19 sectioned by a center line 23, are summed up and the obtained total area representing total surface irregularities along the standard length (L) is then divided by the length (L), which gives the "center line average height (Ra)".

By the use of such construction described above, it also becomes possible to prevent the frictional force from dropping in a vacuum. The reason why it becomes so is the same as that described in the first embodiment of the present invention. As described above, the present invention was made in view of a noticeable influence of the surface roughness of the frictional elements, and therefore is not limited only to the first through the third embodiment.

For example, although each of the embodiments of the present invention has been described with reference to the friction type electromagnetic brake, it is also possible to apply the present invention to various types of drive units and transmission means such as friction type electromagnetic clutches, friction drive units, traction drive units and the like so that the same effect as those obtained in the above embodiment can be accomplished.

Figure 5:
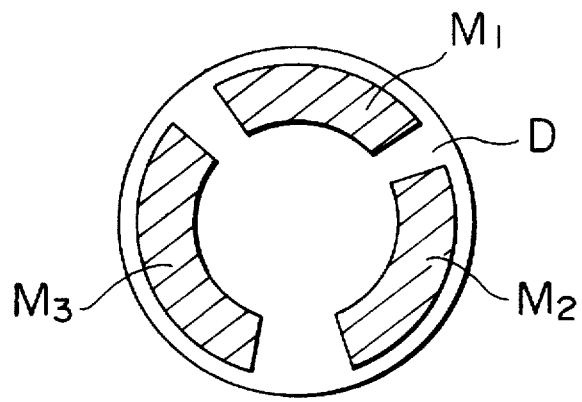
FIG. 5 is a side view of frictional elements used in a fourth embodiment of the present invention.
Figure 6:
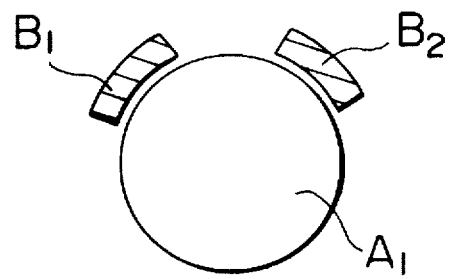
FIG. 6 is a side view of frictional elements used in the fifth embodiment of the present invention.
Figure 7:
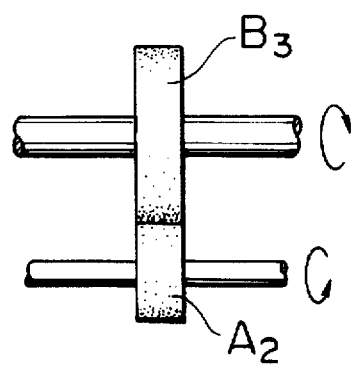
FIG. 7 is a front view of a sixth embodiment of the present invention.
Figure 8:
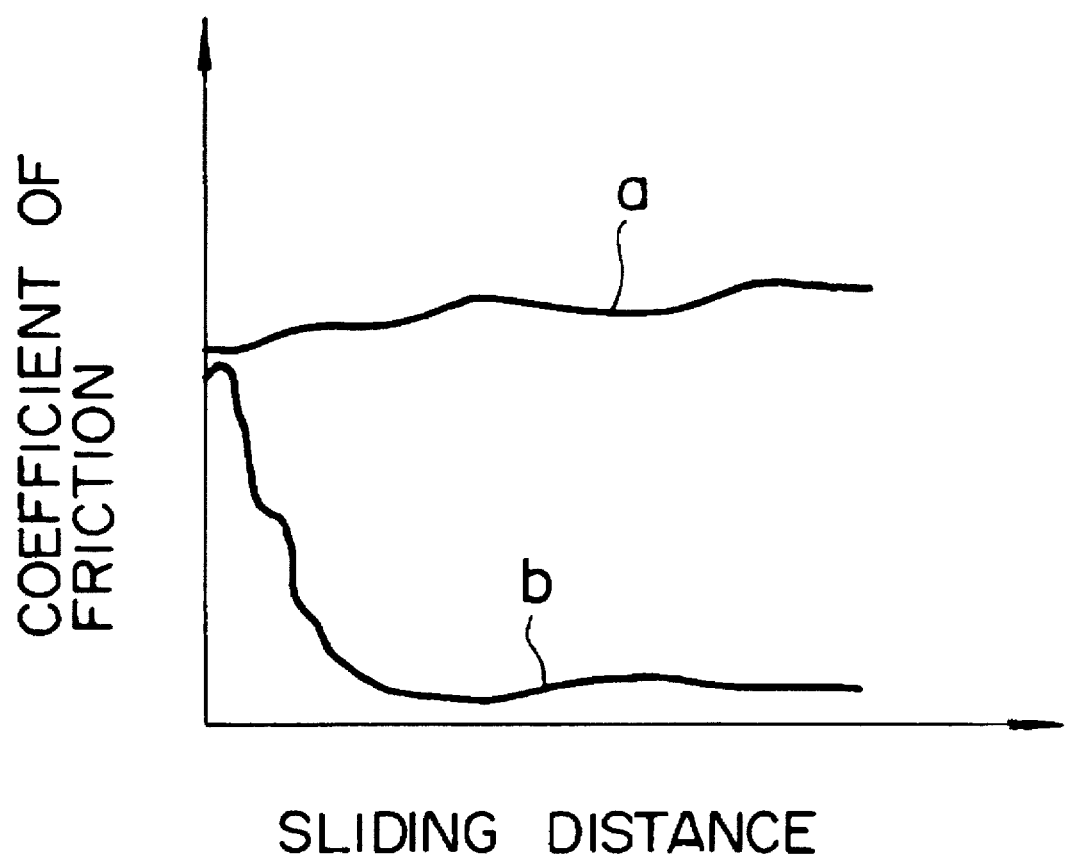
FIG. 8 is a diagram illustrating, in comparison, the relation between the sliding distance and the coefficient of friction in both the atmosphere and a vacuum, which is referred to in the description of the prior art.

Moreover, the frictional elements are not limited in shape to disks, and therefore, may assume various modified shapes, as shown in FIGS. 5 to 7.

As to the type of friction, in addition to the planar friction between planar surfaces which slide relative to each other, there may exist a circumferential friction between cylindrical surfaces which slide relative to each other. FIG. 5 shows frictional elements of a fourth embodiment of the present invention showing frictional elements using planar friction. In the fourth embodiment, a plurality of these elements $M_1$ to $M_3$ each of which assumes a sectorial shape are fixedly mounted on a disk D.

FIG. 6 shows frictional elements of a fifth embodiment of the present invention showing frictional elements using circumferential friction. The fifth embodiment employs a frictional element $A_1$ and a pair of drum shape frictional elements $B_1$ and $B_2$ which are similar in shape to brake shoes and these frictional elements $A_1$, $B_1$ and $B_2$ constitutes a drum-shoe type brake using a cylindrical face.

Further, FIG. 7 shows frictional elements of a sixth embodiment of the present invention applied to a friction drive unit ( i.e., a frictional force transmitting device) constructed of a pair of cylindrical frictional elements $A_2$ and $B_3$ each of which is mounted on a drive(or a driven) shaft for rotation.

Incidentally, since the effect of the surface roughness (irregularities) of the metallic frictional disks according to the present invention is based on the filing of the resin materials which is softer than such metallic disks, it is possible to replace the metallic frictional elements with elements made of non-metallic materials which are harder than mild steel.

As described above, in the frictional force transmitting device of the present invention:

since each of the metallic or non-metallic frictional elements is so constructed as to be coarser in surface roughness than the frictional element made of organic materials;

or, since the surface roughness in maximum height (Rmax) is so selected to be equal to or coarser than 3 microns:

or, since the surface roughness in center line average height(Ra) is so selected as to be equal to or coarser than 0.3 micron, following remarkable effects can be obtained:
(1) it is possible to prevent the frictional force from dropping in a vacuum, thereby permitting the brake to appropriately perform its function in a steady manner for a long period of time: and
(2) therefore, in use, the frictional force transmitting device of the present invention is satisfactorily applied to space devices used in a vacuum, such as brake units for holding and stopping the joints of manipulators used in space stations, and therefore the present invention is very useful in industry.

What is claimed is:

1. In a frictional force transmitting device used in a vacuum for performing the function of at least one of braking, transmitting a frictional force and accelerating/decelerating, said frictional force transmitting device including means for urging mating frictional elements together such that said mating frictional elements are selectively pressed against each other, one of said mating frictional elements being made of organic frictional materials and the other being made of one of a metal and a non-metallic material having a hardness which is equal to or higher than mild steel, wherein:

said one of said mating frictional elements made of one of a metal and a non-metallic material is coarser in surface roughness than that of the other of said mating frictional elements which is made of said organic frictional materials.

2. A frictional force transmitting device used in a vacuum as set forth in claim 1, wherein:

said one of said frictional elements made of one of a metal and a non-metallic material has a surface roughness coarser than 3 microns in maximum height (Rmax).

3. A frictional force transmitting device used in a vacuum as set forth in claim 1, wherein:

said one of said frictional elements made of one of a metal and a non-metallic material has a surface roughness coarser than 0.3 micron in center line average height (Ra).

4. The frictional force transmitting device of claim 1, wherein said one of said frictional elements made of organic frictional materials is a braked element, and the one of said frictional elements made of one of a metal and a non-metallic material is a braking element.

5. The frictional force transmitting device of claim 1 having mating frictional elements, wherein one of said elements is a braking side element made of an organic material, and another of said elements is a braked side element made of one of a metal and a non-metallic material.

6. The frictional force transmitting device of claim 1, wherein said frictional force transmitting device is a small sized light weight device of a light duty device in an actuator for use in a vacuum and in space.

* * * * *

UNITED STATES PATENT AND TRADEMARK OFFICE
CERTIFICATE OF CORRECTION

PATENT NO. : 5,515,953
DATED : MAY 14, 1996
INVENTOR(S) : Hideki TAMURA, et al.

It is certified that error appears in the above-indentified patent and that said Letters Patent is hereby corrected as shown below:

Column 1, line 34, before "Rmax" delete "as"; (2nd occur

Column 3, line 5, change "liding" to --sliding--;

Column 4, line 14, change "dynafriction" to
--dynamic friction--.

Signed and Sealed this

Tenth Day of December, 199

Attest:

BRUCE LEHMAN

*Attesting Officer*         *Commissioner of Patents and Trademarks*